United States Patent
Kobayashi et al.

(10) Patent No.: US 10,072,713 B2
(45) Date of Patent: Sep. 11, 2018

(54) FRICTION PLATE AND WET MULTIPLE-PLATE CLUTCH WITH FRICTION PLATE

(71) Applicant: NSK-WARNER K.K., Shinagawa-ku, Tokyo (JP)

(72) Inventors: Masato Kobayashi, Fukuroi (JP); Tomoyuki Miyazaki, Fukuroi (JP); Shinichi Natsumeda, Fujisawa (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 15/060,329

(22) Filed: Mar. 3, 2016

(65) Prior Publication Data
US 2016/0258493 A1 Sep. 8, 2016

(30) Foreign Application Priority Data
Mar. 4, 2015 (JP) ................. 2015-042084

(51) Int. Cl.
| F16D 13/68 | (2006.01) |
| F16D 13/64 | (2006.01) |
| F16D 65/12 | (2006.01) |
| F16D 69/04 | (2006.01) |
| F16D 25/0638 | (2006.01) |

(52) U.S. Cl.
CPC .......... *F16D 13/68* (2013.01); *F16D 13/648* (2013.01); *F16D 13/683* (2013.01); *F16D 65/127* (2013.01); *F16D 69/0408* (2013.01); *F16D 25/0638* (2013.01); *F16D 2069/0466* (2013.01)

(58) Field of Classification Search
CPC ............................... F16D 13/68; F16D 13/648
See application file for complete search history.

(56) References Cited

U.S. PATENT DOCUMENTS

| 7,958,984 | B2* | 6/2011 | Kobayashi | ............ F16D 13/64 |
| | | | | 192/107 R |
| 9,027,728 | B2* | 5/2015 | Hiramatsu | ............ F16D 13/648 |
| | | | | 192/113.36 |
| 2006/0131125 | A1 | 6/2006 | Kinoshita et al. | |
| 2015/0292567 | A1* | 10/2015 | Kishimoto | ............ F16D 13/52 |
| | | | | 192/70.11 |
| 2016/0025158 | A1 | 1/2016 | Kobayashi et al. | |

FOREIGN PATENT DOCUMENTS

| JP | H04-136524 A | 5/1992 |
| JP | 2005-076759 A | 3/2005 |
| JP | 2006-118647 A | 5/2006 |
| JP | 2008-180314 A | 8/2008 |
| JP | 2016-23754 A | 2/2016 |

OTHER PUBLICATIONS

Office Action, dated Apr. 17, 2018, in Japanese Patent Application No. 2015-042084.

* cited by examiner

*Primary Examiner* — Jacob S. Scott
*Assistant Examiner* — Tinh Dang
(74) *Attorney, Agent, or Firm* — Shapiro, Gabor and Rosenberger, PLLC (57) ABSTRACT

A friction plate is formed in such a manner that a plurality of friction material segments fixed to an annular core plate, wherein a passage extends through from an inner diameter side to an outer diameter side and is defined between the plurality of friction material segments, and a forming portion for retaining air is provided on a bottom surface of the passage.

21 Claims, 5 Drawing Sheets

FRICTION PLATE AND WET MULTIPLE-PLATE CLUTCH WITH FRICTION PLATE

BACKGROUND OF THE INVENTION

Field of the Invention

The present invention relates to a friction plate used for a clutch and a brake of automatic transmission of vehicle.

Description of the Related Art

Drag torque between a friction plate and a counterpart plate during idling in the wet multiple-plate clutch of automatic transmission is a part of driving resistance associated with fuel economy of vehicle and reduction thereof greatly contributes to fuel economy improvement and $CO_2$ emission control of vehicle. Conventionally, an effect for reducing the drag torque between the friction plates and the counterpart plates has been obtained by an effect for discharging (separating and the like) oil through a groove on a friction surface of the friction plate or an oil path between friction materials. This is disclosed in Japanese Patent Application Laid-Open No. 2005-076759 and in Japanese Patent Application Laid-Open No. 2008-180314.

Further, regarding a problem of demand for reducing the drag torque on the friction plates, how viscous resistance of fluid lubrication can be reduced specifically in a low rotation region is a key to solve the problem. In this regard, as disclosed in Japanese Patent Application No. 2014-149484, a certain effect can be obtained at 1000 rpm or less of a relative number of rotations by providing a groove on a segment-shaped surface of the friction plate.

However, fuel economy regulation and emission regulation in vehicle become stricter year by year. And if specifically a current problem of reducing viscous resistance of fluid lubricant that is high in a low rotation region that is around 500 rpm of a relative number of rotations in which the drag torque on the friction plates is great, is solved, a friction plate of wet multiple-plate clutch for automatic transmission can contribute toward achieving the fuel economy regulation and the emission regulation in vehicle. However, currently (in each of the above-mentioned references), there has not yet been found a method for reducing the viscous resistance of fluid lubricant of the friction plates in the low rotation region.

Further, a separation effect between friction plates using oil discharge force and an effect for reducing the viscous resistance of fluid lubricant by improving discharge property of oil by a groove of the friction plate, both of which effects are intended to reduce the drag torque, can be obtained by increase of rotation so that those effects have not yet been obtained in the low rotation region.

SUMMARY OF THE INVENTION

Accordingly, an object of the present invention is to provide a friction plate of a wet multiple-plate clutch, which is provided with a forming portion to facilitate retention of a bubble between the friction material segments and to reduce drag torque in a low rotation region remarkably.

To attain the above object, a friction plate is formed in such a manner that a plurality of friction material segments fixed to an annular core plate, wherein a passage extends through from an inner diameter side to an outer diameter side and is defined between the plurality of friction material segments, and a forming portion for retaining air is provided on a bottom surface of the passage.

The forming portion (a minute groove, a projection and an uneven portion) for retaining a bubble provided between a friction material segments of the friction plate enables air (bubble in oil) present in a stopped state and a rotational state of the friction plates to be retained. As retention of bubble increases or occurs from an early stage of rotation, a state of gas-liquid multiphase flow can be made from the fluid lubricant at the early stage of rotation.

Thereby, the effect is exhibited in the low rotation region where a viscous resistance is great in oil filled fluid lubricant, and the drag torque specifically around 500 rpm of a relative number of rotations can be reduced remarkably.

A forming portion for retaining a bubble is formed between friction material segments not only to promote generation of air but to retain air easily. Air rises on a surface of a friction material so that shearing resistance of oil between the friction plate and the counterpart plate is decreased and the drag torque can be reduced in the low rotation region (specifically at around 500 rpm of relative number of rotations) remarkably.

The friction material segments opened outside are shaped in such a manner that a minute groove, a projection or an uneven portion is disposed in passages located in a forward direction with respect to a rotation direction of an opened groove to retain or generate air and the opened groove of the friction material becomes a negative pressure by rotation to retain air, so that the effect becomes more significant.

Although air is also discharged together with oil from a simple radial (radial) groove by centrifugal force, the passage is formed in a shape of a minute groove, a projection or an uneven portion so that the air going out is retained or reverted to the passage by generation of negative pressure in the rotation direction.

Further features of the present invention will become apparent from the following description of exemplary embodiments with reference to the attached drawings.

DESCRIPTION OF THE EMBODIMENTS

Each embodiment of the present invention will now be described in detail below in accordance with the accompanying drawings. It is noted that each of embodiments to be described below is an example of the present invention and it is needless to say that the present invention is not limited to each of the embodiments. In the drawings, the same components are denoted by the same reference numerals.

The term "air" used in the present specification generally refers to air present in lubricant, but also includes vapor or other air in the lubricant. Further, air is present as gas in lubricant but is generally present as a bubble.

Figure 1:
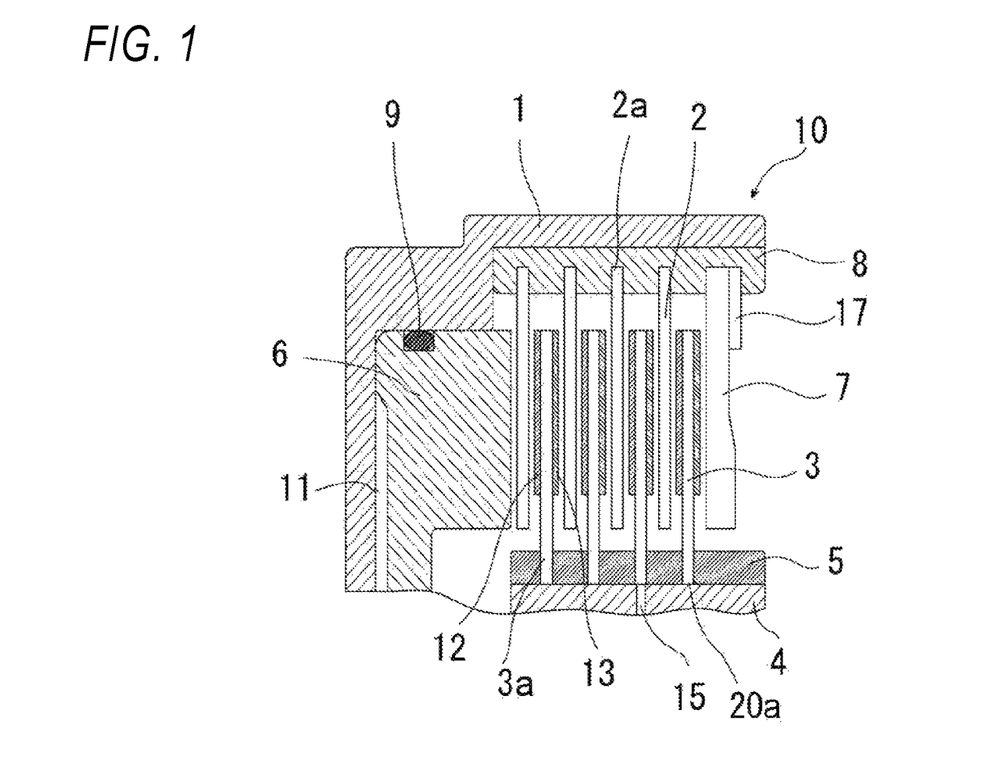
FIG. 1 is a partial sectional view in an axial direction of a wet multiple-plate clutch provided with friction plates in accordance with the present invention.

FIG. 1 is a partial sectional view in an axial direction of a wet multiple-plate clutch 10 provided with friction plates in accordance with the present invention. The friction plates of each of embodiments of the present invention can be used for the wet multiple-plate clutch.

The wet multiple-plate clutch 10 is constituted of a substantially cylindrical clutch drum 1, which is open at one end in an axial direction, a hub 4, which is disposed on the inner periphery of the clutch drum 1 and which coaxially and relatively rotates, annular separator plates 2, which are disposed on a spline 8 movably in the axial direction, the spline 8 being provided on the inner periphery of the clutch drum 1, and annular friction plates 3, each of which is disposed on a spline 5, which is provided on the outer periphery of the hub 4, alternately with the separator plates 2 in the axial direction, and which have friction surfaces to which friction material segments are fixed with an adhesive agent. Each of the separator plates 2 has a spline portion 2a, which engages with the spline 8, and each of the friction plates 3 has a spline portion 3a, which engages with the spline 5. There are provided a plurality of the friction plates 3 and a plurality of the separator plates 2.

The wet multiple-plate clutch 10 is provided with a piston 6, which pushes and fastens the separator plates 2 and the friction plates 3, and a backing plate 7 and a stopper ring 17 retaining the backing plate 7, which are provided on the inner periphery of the clutch drum 1 to retain the separator plates 2 and the friction plates 3 in a fixed state at one end in the axial direction.

As illustrated in FIG. 1, the piston 6 is disposed such that it is slidable in the axial direction at the closed end of the clutch drum 1. An O-ring 9 is interposed between the outer circumferential surface of the piston 6 and the inner surface of the clutch drum 1. Further, a sealing member (not illustrated) is interposed between the inner circumferential surface of the piston 6 and the outer circumferential surface of the inner circumferential cylindrical portion (not illustrated) of the clutch drum 1. Thus, a hydraulic chamber 11 in an oil-tight state is defined between the inner surface at the closed end of the clutch drum 1 and the piston 6.

Friction material segments 12 and 13, which have predetermined friction coefficients, are fixed to both surfaces of each of the friction plates 3, which are retained by the hub 4 such that they are slidable in the axial direction. Alternatively, however, the friction material segments 12 and 13 may be provided on only one side of the friction plate 3. Further, the hub 4 has a lubricant supply port 15, which penetrates in the radial direction. Through the lubricant supply port 15, a lubricant is supplied from the inside diameter side to the outside diameter side of the wet multiple-plate clutch 10.

The wet multiple-plate clutch 10 having the foregoing construction engages (fastens) and disengages a clutch as described below. FIG. 1 illustrates a state in which the clutch has been disengaged, the separator plates 2 and the friction plates 3 being separated. In the disengaged state, the piston 6 is in contact with the closed end side of the clutch drum 1 due to the urging force of a return spring (not illustrated).

In order to engage the wet multiple-plate clutch 10 in the disengaged state, an oil pressure is supplied to the hydraulic chamber 11 defined between the piston 6 and the clutch drum 1. As the oil pressure increases, the piston 6 moves to the right in the axial direction in FIG. 1 against the urging force of the return spring (not illustrated), bringing the separator plates 2 and the friction plates 3 into close contact with each other. Thus, the wet multiple-plate clutch 10 is engaged.

In order to disengage the wet multiple-plate clutch 10 again after the wet multiple-plate clutch 10 is set to the engaged state, the oil pressure to the hydraulic chamber 11 is released. Upon releasing the oil pressure, the urging force of the return spring (not illustrated) causes the piston 6 to move to the position where the piston 6 comes in contact with the closed end of the clutch drum 1. Thus, the wet multiple-plate clutch 10 is disengaged.

Figure 2:
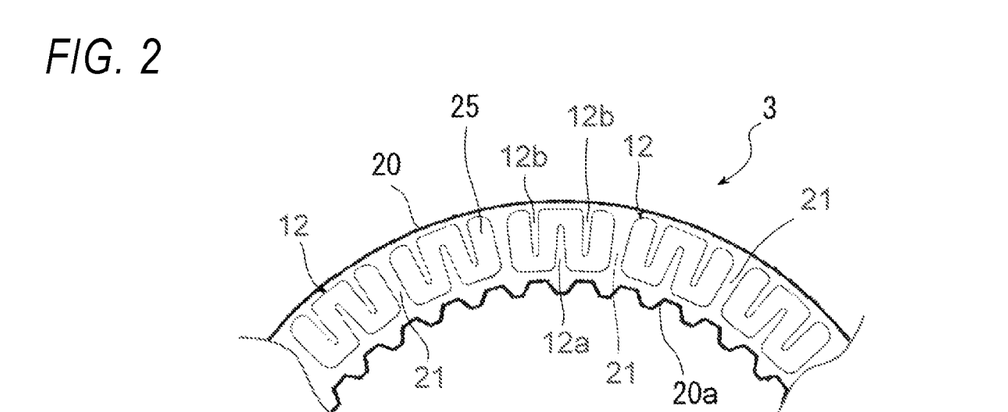
FIG. 2 is a partial front view of a friction plate for which each embodiment of the present invention can be used.

FIG. 2 is a partial front view of the friction plate 3 for which each embodiment of the present invention can be used. The plate 3 is provided with a friction surface 25 formed by a plurality of friction material segments 12 that are the same as each other and that are annularly fixed by adhesive agent or the like to surfaces in an axial direction of substantially annular core plate 20. The core plate 20 is provided with a spline 20a engaged with the spline 5 of the hub 4 at an inner periphery thereof. Although the friction plate 3 is partially illustrated in FIG. 2, the friction material segments 12 are fixed annularly with a constant interval to the core plate 20 at portions that are omitted from the drawings, similarly to the ones illustrated in FIG. 2.

The friction material segment 12 is provided with an oil groove 12a, which is opened at an inner diameter side and is terminated in the friction material segment 12 at an outer diameter side, and oil grooves 12b, each of which is opened at the outer diameter side and is terminated in the friction material segment 12 at the inner diameter side.

The oil groove 12a is formed in the substantially center in a circumferential direction of the friction material segment 12. Further, two oil grooves 12b are formed at both sides of the oil groove 12a in the circumferential direction while sandwiching the oil groove 12a. The provision of the oil groove 12b opened at only the outer diameter side enables the oil dragged in the friction surface 25 from the oil passage 21 to be discharged to the outer diameter side smoothly, thereby making it possible to reduce drag torque during idling. A remarkable effect in reduction of drag torque can be obtained specifically in the low rotation region.

The oil passage 21 is defined between a friction material segment 12 and a friction material segment 12 to extend through from the inner diameter side to the outer diameter side of the friction plate 3. Accordingly, the friction material segments 12 and the oil passages 21 are alternately disposed in the circumferential direction.

First Embodiment

Figure 3:
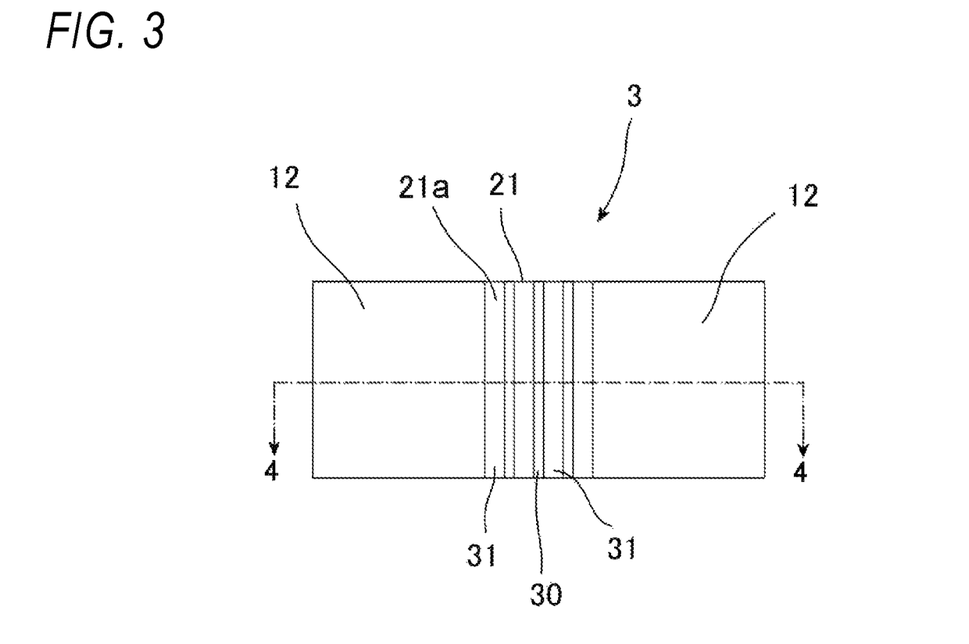
FIG. 3 is a top view illustrating a forming portion according to a first embodiment of the present invention.
Figure 4:
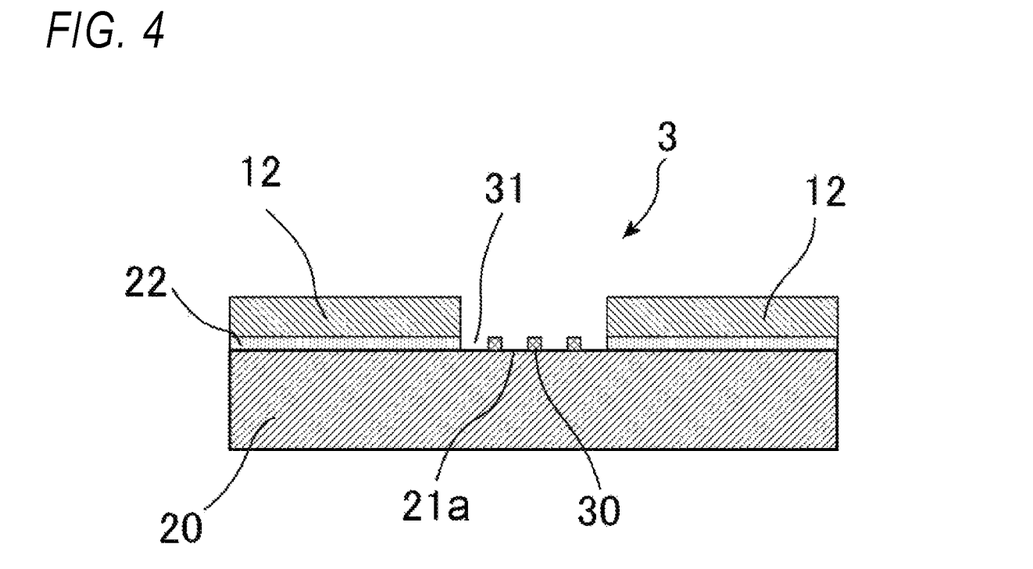
FIG. 4 is a cross sectional view taken along a line 4-4 of FIG. 3, illustrating the forming portion according to the first embodiment of the present invention.

FIG. 3 is a top view illustrating a forming portion according to a first embodiment of the present invention, and FIG. 4 is a cross sectional view taken along a line 4-4 of FIG. 3, illustrating the forming portion according to the first embodiment of the present invention. As illustrated in FIG. 3, a plurality of minute grooves 31 are formed to extend from the inner diameter side to the outer diameter side of the friction plate 3 on a bottom surface 21a of an oil passage (passage) 21 between friction material segments 12 as the forming portion. Although three grooves 31 are formed in the first embodiment, any number thereof is formed and another number thereof for example such as two or four may be adopted.

As it will be appreciated from FIG. 4, there are three projecting portions 30 that project from a surface of adhesive agent 22 applied on a core plate 20. Each of the projecting portions 30 is projected in the axial direction to extend linearly from the inner diameter side to the outer diameter side of the friction plate 3. Grooves 31 are defined between the projecting portions 30 and walls of the friction material segments 12 and between the projecting portions 30. Although a cross section of each of the projecting portions 30 is shaped in rectangular form in the circumferential direction, it may be also formed in another shape.

The grooves 31 can be formed by machining (cutting or the like), molding processing (embossing or the like), laser machining or the like. Further, they can be formed directly on a surface, exposed to an oil passage 21, of the core plate 20 by similar processing methods without the adhesive agent 22.

The grooves 31 are formed by the above-mentioned processing method with unillustrated processing machine so as to be formed at intervals of 100 μm between the friction material segments 12 as the minute grooves. A length in a diameter direction of the grooves 31 may be set to a length similar to that of the friction material segment 12 in the diameter direction from the outer diameter side to the inner diameter side of the friction plate 3. However, the grooves 31 may be any length in a diameter direction and they can be shorter or longer than a length of the friction material segments 12 in the diameter direction.

The grooves 31 preferably have a width of 50 to 500 μm and a depth of 10 to 500 μm. If the width of the grooves 31 is smaller or equal to 50 μm, the effect cannot be obtained and if the width of the grooves 31 is greater than or equal to 500 μm, air (bubble) flows out easily so that the effect can no longer be obtained. Further, if the depth of the grooves 31 is smaller or equal to 10 μm, the effect cannot be obtained and if it is greater than or equal to 500 μm, strength of the core plate 20 is lowered.

Second Embodiment

Figure 5:
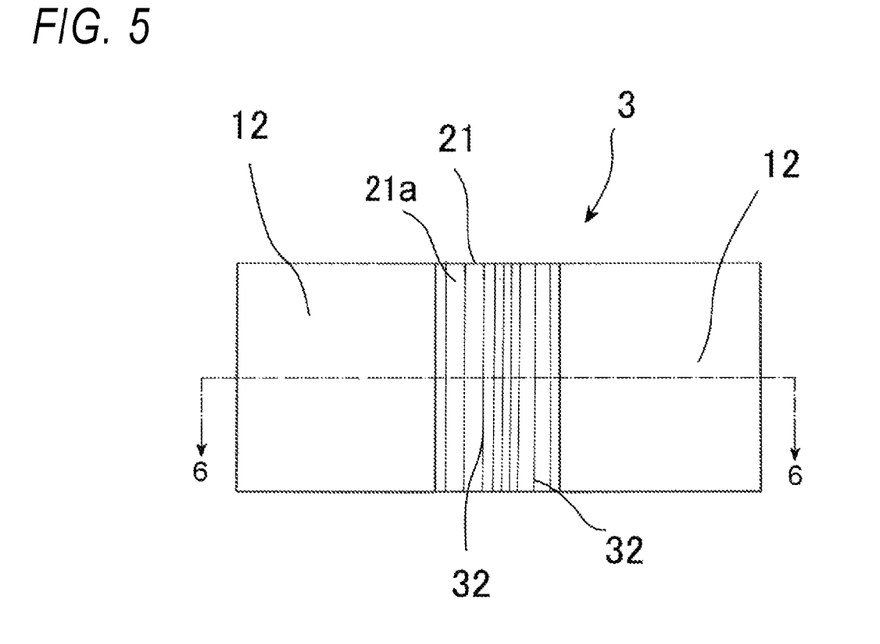
FIG. 5 is a top view illustrating a forming portion according to a second embodiment of the present invention.
Figure 6:
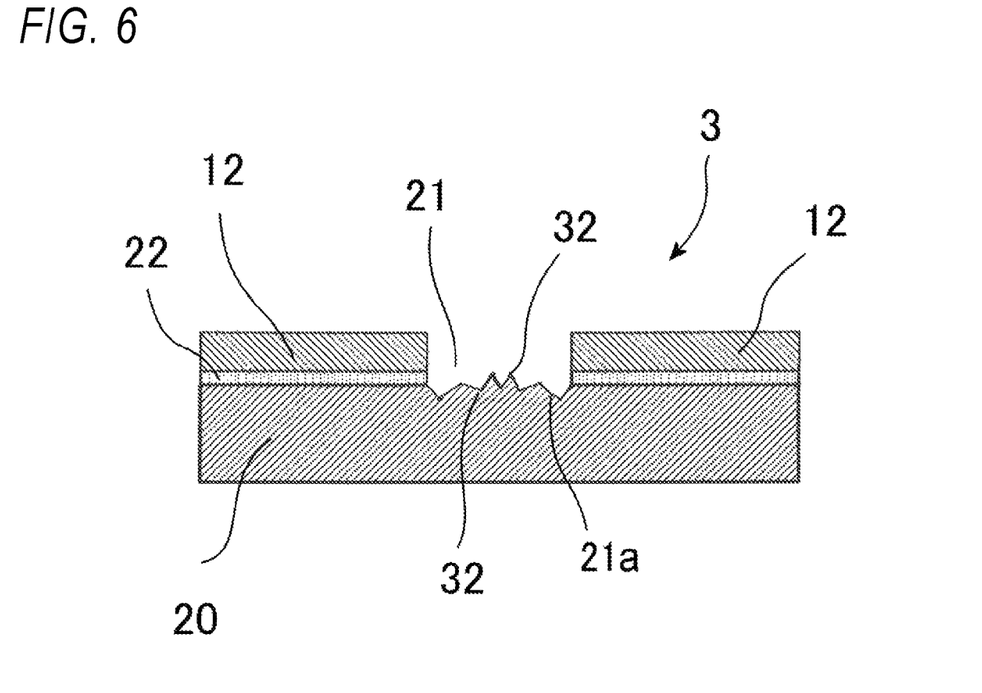
FIG. 6 is a cross sectional view taken along a line 6-6 of FIG. 5, illustrating the forming portion according to the second embodiment of the present invention.

FIG. 5 is a top view illustrating a forming portion according to a second embodiment of the present invention, and FIG. 6 is a cross sectional view taken along a line 6-6 of FIG. 5, illustrating the forming portion according to the second embodiment of the present invention. As illustrated in FIG. 5, a plurality of minute uneven portions 32 are formed on a bottom surface 21a of the oil passage (passage) 21 between friction material segments 12 as the forming portion for retaining air. Although the uneven portions 32 are formed on a surface of the core plate 20, they may be formed on a surface of adhesive agent 22. Further, although the uneven portions 32 are formed in a wave and linear form on the bottom surface 21a of the oil passage 21, they may be formed in an intermittent and curved form. Each of the uneven portions 32 may include a plurality of concave and convex portions.

The uneven portions 32 are formed regularly or irregularly on the bottom surface 21a of the oil passage 21. The uneven portions 32 are formed in such a manner that after the adhesive agent 22 is applied to the core plate 20, the bottom surface 21a of the oil passage 21 between the friction material segments 12 is made rough by shot blast to have 5 μm in Ra (arithmetic average roughness).

The surface roughness of the uneven portions 32 are preferably 0.1 to 10 μm in Ra (arithmetic average roughness). This is because the effect cannot be obtained if it is less than or equal to 0.1 μm and a discharge property of oil is deteriorated if it is greater than or equal to 10 μm.

The uneven portions 32 may be partially provided, but are preferably provided in all regions of the oil passage 21.

Third Embodiment

Figure 7:
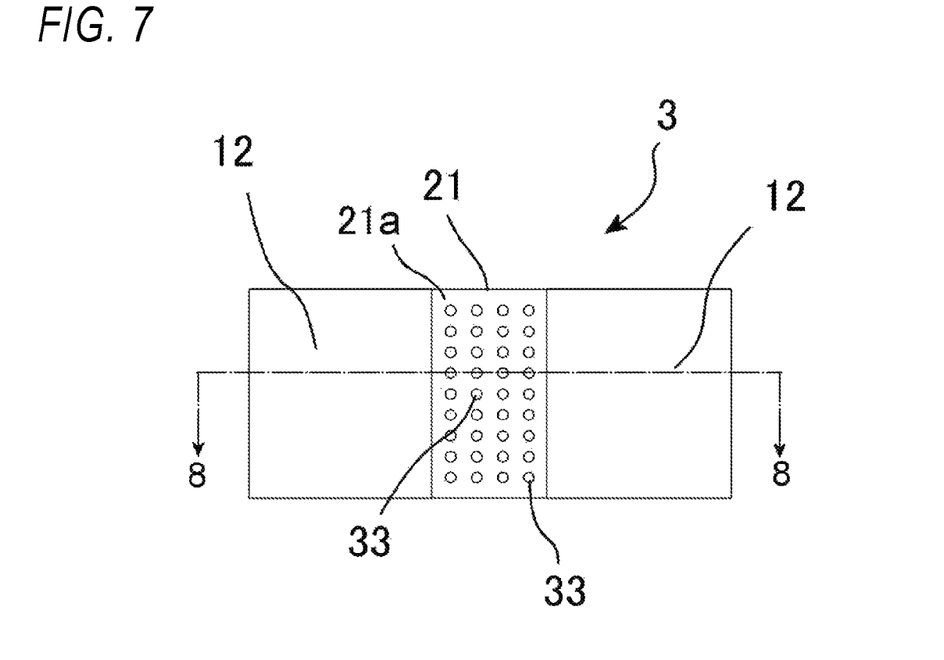
FIG. 7 is a top view illustrating a forming portion according to a third embodiment of the present invention.
Figure 8:
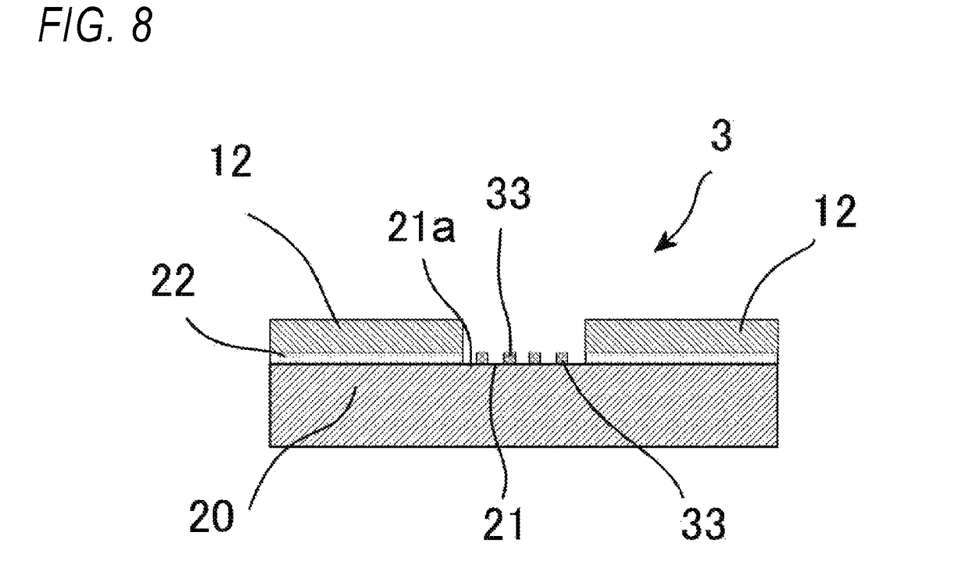
FIG. 8 is a cross sectional view taken along a line 8-8 of FIG. 7, illustrating the forming portion according to the third embodiment of the present invention.

FIG. 7 is a top view illustrating a forming portion according to a third embodiment of the present invention, and FIG. 8 is a cross sectional view taken along a line 8-8 of FIG. 7, illustrating the forming portion according to the third embodiment of the present invention. As illustrated in FIG. 7, a plurality of minute projections 33 are formed on a bottom surface 21a of an oil passage (passage) 21 between friction material segments 12 as the forming portion for retaining air. Although the projections 33 are formed on a surface of adhesive agent 22 in the embodiment, they may be formed on a surface of the core plate 20.

The projections 33 are formed in such a manner that the adhesive agent 22 is applied to the core plate 20 and subsequently a die on which minute holes having a diameter of 200 μm and a depth of 200 μm are formed is pressed under a constant pressure against the oil passage 21 between the friction material segments 12 so that the plurality of projections 33 are formed on a surface of the layered adhesive agent 22 or the core plate 20.

The plurality of projections 33 may be formed in a columnar shape, a conical shape, a pyramidal shape or the like. They may be formed in one of a columnar shape, a conical shape and a pyramidal shape or a combination thereof. They preferably have a radius of 0.1 to 1 mm, a height of 0.01 to 0.3 mm, and an area rate of 10 to 50% to the bottom surface 21a of the oil passage 21. Furthermore, they are irregular in size and are not uniform in size.

It is not preferable that each of the projections 33 has a radius smaller than or equal to 0.1 mm, since the effect cannot be obtained, and it is not preferable that each of those has a radius greater than or equal to 1 mm, since an adverse effect influences on a discharge property of oil. Further, it is not preferable that each of those has a height less than or equal to 0.01 mm, since the effect cannot be obtained, and it is not preferable that each of those has a height greater than or equal to 0.3 mm, since an engagement property is deteriorated due to a possibility of contact with a counterpart plate. Furthermore, the height may be uneven. It is not preferable that an area rate of a total area of the plurality of projections 33 to an area of the bottom surface 21a of the oil passage 21 is less than or equal to 10%, since the effect cannot be obtained, and it is not preferable that an area rate of a total area of the plurality of projections 33 to an area of the bottom surface 21a of the oil passage 21 is greater than or equal to 50%, since an adverse effect influences on a discharge property of oil.

In each of the above-mentioned embodiments, in order to obtain the effect by the forming portion satisfactorily, it is preferable that the friction material segments 12 are provided with the oil grooves 12b opened at only the outer diameter side. This is because the oil dragged in the friction surface 25 from the oil passage 21 is discharged to the outer diameter side smoothly and the drag torque can be lowered during idling. The effect of reduction of drag torque is remarkable specifically in the low rotation region.

Depending on shapes of the friction material segments 12, it is not necessary to provide forming portions for retaining air all between the friction material segments 12. Further, in a case where a friction material segment has a shape by which an oil discharge property is deteriorated and a drag torque becomes great in the low rotation region where the effect is aimed at, it is preferable to partially decrease a number of places where the forming portion is formed.

In a case where the fiction material segments 12 are constituted by not a segment-shaped friction materials but a ring-type (annular) shaped one, a minute hole, an uneven portion or the like is formed on a molding die correspondingly to a portion becoming the oil passage 21, and a minute groove, an uneven portion or a projection can be formed by performing transfer on the bottom surface 21a of the oil passage 21, so that the same effect as described above can be obtained.

In each of the embodiments, the minute grooves, the uneven portions or projections are formed on the surface of the core plate 20 or on the adhesive agent 22 applied to the surface of the core plate 20 as the forming portion. However, a forming portion can be formed in such a manner that a sheet-like member provided with minute grooves, uneven portions or projections may be adhered to the surface of the core plate 20 or the adhesive agent 22.

(Evaluation Test Results)

Figure 9:
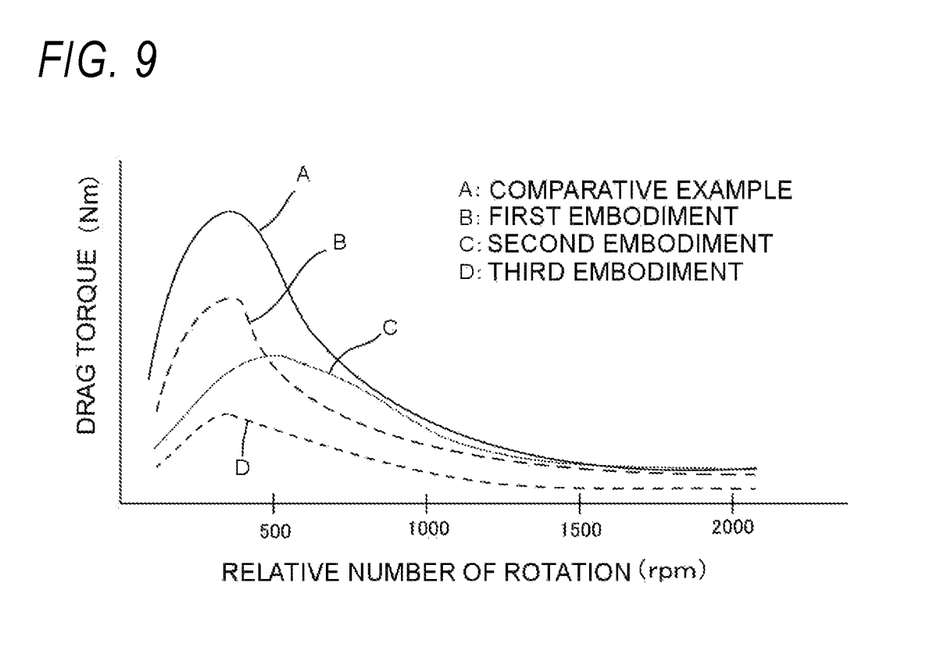
FIG. 9 is a graph illustrating effects of each embodiment of the present invention and a comparative example (prior art).

Shown hereinafter will be evaluation test results of friction plates according to each embodiment of the present invention and a comparative example (prior art). Table 1 shows evaluation conditions and a graph of FIG. 9 illustrates effects of each embodiment of the present invention and a comparative example (prior art).

Evaluation tests have been conducted with a drag torque measurement testing machine under the test conditions described in Table 1.

TABLE 1

| ITEM | CONDITION |
| --- | --- |
| NUMBER OF ROTATIONS (rpm) | 0-5000 |
| DIAMETER OF WET FRICTION TYPE PLATE (mm) | φ157 |
| NUMBER OF FRICTION PLATES(NUMBER OF PLATES) | 3 |
| LUBRICANT (AXIAL CENTER: L/min) | 0.5 |
| OIL TEMPERATURE (° C.) | 40 |

In the graph of FIG. 9, a vertical axis indicates a drag torque (Nm) and a horizontal axis indicates a relative number of rotations (rpm). In FIG. 9, a curve A indicates a comparative example (what is provided with an oil passage including a conventional smooth bottom surface), a curve B indicates the first embodiment (minute grooves 31), a curve C indicates the second embodiment (uneven portions 32) and a curve D indicates the third embodiment (projections 33).

As will be appreciated from FIG. 9, the friction plates 3 of each embodiment of the present invention enable drag torque to be reduced in the low relative number of rotations compared to the comparative example. Specifically, it will be appreciated that if the projections 33 are formed between the friction material segments 12 as in the third embodiment, the oil passages enable drag torque to be reduced compared to the comparative example in which the oil passage is smooth. More specifically, it is reduced significantly in the low rotation region that is around 500 rpm of the relative number of rotations that is high in demand.

The present invention having been described above is not limited to each embodiment mentioned above and the friction material segments can be formed into shapes other than the illustrated shapes. Further, the invention can be applied to a friction material segment having an oil groove different in configuration or having no oil groove. Note that it is needless to say that the grooves, the uneven portions, and the projections are illustrated not in actual dimension but in exaggerated form for convenience of explanation. Further, the forming portions such as the grooves, the concave convex portions and the projecting portions can be formed integrally with the bottom surface (namely, the surface of the core plate 20) of the oil passage.

The invention having been explained above can be used for vehicle and the like in which an automatic transmission is installed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-042084, filed Mar. 4, 2015, which is hereby incorporated by reference herein in its entirety.

What is claimed is:

1. A friction plate formed in such a manner that a plurality of friction material segments fixed to an annular core plate, wherein a passage extends through from an inner diameter side to an outer diameter side and is defined between the plurality of friction material segments,
   a forming portion for retaining air is provided on a bottom surface of the passage, and
   the forming portion includes a projection, the projection has a radius of 0.1 to 1 mm, a height of 0.01 to 0.3 mm, and an area rate of 10 to 50% to the passage.

2. The friction plate according to claim 1, wherein the projection is provided in plural and each of the plural projections is formed in one of a columnar shape, a conical shape and a pyramidal shape or a combination thereof.

3. The friction plate according to claim 1, wherein an adhesive agent is provided between the core plate and the plurality of friction material segments and the forming portion is formed on a surface of the adhesive agent.

4. The friction plate according to claim 1, wherein the forming portion is formed integrally with a surface of the core plate.

5. A wet multiple-plate clutch comprising:
   the friction plate according to claim 1; and
   a separator plate disposed alternately with the friction plate in an axial direction.

6. A friction plate comprising:
   an annular core plate;
   a plurality of friction material segments fixed to a first surface of the core plate, each friction material segment being spaced apart from an adjacent friction material segment in a circumferential direction of the annular core plate so as to define an oil passage between each adjacent pair of friction material segments, each oil passage extending from an inner diameter side to an outer diameter side; and
   means for retaining air provided within one or more of the oil passages.

7. The friction plate according to claim 6,
wherein each oil passage is defined by radially extending sidewalls of the adjacent friction material segments, and
the means for retaining air is disposed between said sidewalls in the circumferential direction.

8. A friction plate comprising:
an annular core plate;
a plurality of friction material segments on a first surface of the core plate, each friction material segment being spaced apart from an adjacent friction material segment in a circumferential direction of the annular core plate so as to define an oil passage between facing sidewalls of each adjacent pair of friction material segments, each oil passage extending from an inner diameter side to an outer diameter side; and
one or more protrusions within at least one of the oil passages, each protrusion being formed on or from the first surface within said at least one of the oil passages and protruding in a direction perpendicular to the first surface,
wherein the one or more protrusions are constructed to retain air within the at least one of the oil passages.

9. The friction plate according to claim 8, wherein, in the direction perpendicular to the first surface, a height of each protrusion is less than heights of the corresponding adjacent pair of friction material segments.

10. The friction plate according to claim 8, wherein the one or more protrusions comprises:
a plurality of radially extending projections spaced from each other in the circumferential direction so as to define minute grooves within the at least one of the oil passages.

11. The friction plate according to claim 10, wherein each minute groove has a width of 50 to 500 μm and a depth of 10 to 500 μm.

12. The friction plate according to claim 8, wherein the one or more protrusions are formed by a surface roughness of the first surface within the at least one of the oil passages that is 0.1 to 10 μm in arithmetic average roughness.

13. The friction plate according to claim 8, wherein the one or more protrusions comprises:
a columnar projection protruding from the first surface and having a radius of 0.1 to 1 mm and a height of 0.01 to 0.3 mm.

14. The friction plate according to claim 8, wherein an adhesive is provided over the first surface of the core plate and the one or more protrusions are formed from a surface of the adhesive.

15. The friction plate according to claim 8, wherein the one or more protrusions are formed from the first surface.

16. A friction plate formed in such a manner that a plurality of friction material segments fixed to an annular core plate,
wherein a passage extends through from an inner diameter side to an outer diameter side and is defined between the plurality of friction material segments,
a forming portion for retaining air is provided on a bottom surface of the passage, and
the forming portion is provided with a surface of an adhesive agent applied on a surface of the core plate.

17. The friction plate according to claim 16, wherein the forming portion includes a groove and the groove has a width of 50 to 500 μm and a depth of 10 to 500 μm.

18. The friction plate according to claim 16, wherein the forming portion includes an uneven portion and a surface roughness of the uneven portion is 0.1 to 10 μm in Ra (arithmetic average roughness).

19. The friction plate according to claim 16, wherein the forming portion includes a projection, the projection has a radius of 0.1 to 1 mm, a height of 0.01 to 0.3 mm, and an area rate of 10 to 50% to the passage.

20. The friction plate according to claim 19, wherein the projection is provided in plural and each of the plural projections is formed in one of a columnar shape, a conical shape and a pyramidal shape or a combination thereof.

21. A wet multiple-plate clutch comprising:
the friction plate according to claim 16; and
a separator plate disposed alternately with the friction plate in an axial direction.

* * * * *